United States Patent
Breay et al.

(10) Patent No.: US 8,956,556 B2
(45) Date of Patent: *Feb. 17, 2015

(54) DIELECTRIC ISOLATORS

(75) Inventors: Clifton P. Breay, Littleton, CO (US);
Sara D. Pfannenstiel, Thornton, CO (US); Stephen C. Matthews, Denver, CO (US); Edward W. S. Bryant, Winona, MN (US)

(73) Assignee: Eaton Corporation, Cleveland, OH (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/347,516

(22) Filed: Dec. 31, 2008

(65) Prior Publication Data

US 2010/0001512 A1      Jan. 7, 2010

Related U.S. Application Data

(63) Continuation-in-part of application No. 12/166,698, filed on Jul. 2, 2008, now Pat. No. 8,003,014.

(51) Int. Cl.
*B64D 37/32*         (2006.01)
*F16L 25/02*         (2006.01)
(Continued)

(52) U.S. Cl.
CPC .............. *F16L 25/025* (2013.01); *B64D 37/32* (2013.01); *B64D 45/02* (2013.01); *F16L 25/021* (2013.01);
(Continued)

(58) Field of Classification Search
USPC ............................. 252/500–518.1, 502, 510; 285/390–404; 428/36.4, 299.1, 299.7, 428/301.4, 349; 174/137 R; 977/734, 742, 977/753
See application file for complete search history.

(56) References Cited

U.S. PATENT DOCUMENTS 3,207,537 A * 9/1965 Kimbrell et al. ............. 285/353
4,060,264 A * 11/1977 Gajajiva ................... 285/148.19
(Continued)

FOREIGN PATENT DOCUMENTS

| EP | 0001879 | 5/1979 |
| EP | 0718350 | 3/2001 |

(Continued)

OTHER PUBLICATIONS

Nanotube Compounds-Uniformly Conductive Thermoplastics from RTP Company; RTP Co. Imagineering Plastics Product Development; May 2007, 2 pages.

(Continued)

*Primary Examiner* — Tri V Nguyen
(74) *Attorney, Agent, or Firm* — Sheridan Ross P.C.

(57) ABSTRACT

The present application is directed to dielectric isolators for use in aircraft fuel systems to control lightning induced current and allow dissipation of electrostatic charge. The dielectric isolators are configured to have a high enough impedance to limit lightning currents to low levels, but low enough impedance to allow electrostatic charge to dissipate without allowing buildup. Although the dielectric isolators may develop a potential difference across the dielectric length due to the effects of lightning currents and its inherent impedance, they are configured to withstand these induced voltages without dielectric breakdown or performance degradation. In one embodiment, the dielectric isolator includes a tube constructed of a composition including a thermoplastic organic polymer (e.g., PEEK) and carbon nanotubes, and a pair of fittings attached to opposing ends of the tube. In another embodiment, the dielectric isolator includes a tube, an outer annular portion, and an interconnecting web, each constructed from the composition including a thermoplastic organic polymer (e.g., PEEK) and carbon nanotubes. This later embodiment is an integrally formed one-piece structure. The dielectric isolator is capable of exhibiting an electrical resistance from about $10^5 \Omega$ to $10^8 \Omega$ at an applied potential of greater than 500 volts DC when measured from one fitting to the other fitting.

10 Claims, 9 Drawing Sheets

(51) Int. Cl.
  *B64D 45/02* (2006.01)
  *F16L 39/00* (2006.01)
  *F16L 5/12* (2006.01)

(52) U.S. Cl.
  CPC ............ *F16L 25/023* (2013.01); *F16L 39/005* (2013.01); *F16L 5/12* (2013.01); *Y02T 50/44* (2013.01); *Y10S 977/734* (2013.01); *Y10S 977/742* (2013.01); *Y10S 977/753* (2013.01)
  USPC ....... 252/502; 252/510; 428/36.4; 428/299.1; 428/299.7; 428/301.4; 428/349; 174/137 R; 977/734; 977/742; 977/753

(56) References Cited

U.S. PATENT DOCUMENTS

| | | |
|---|---|---|
| 4,654,747 A | 3/1987 | Covey |
| 4,902,444 A | 2/1990 | Kolouch |
| 4,933,178 A | 6/1990 | Capelli |
| 4,971,268 A | 11/1990 | Dobrowski et al. |
| 4,985,801 A | 1/1991 | Hellard et al. |
| 5,000,875 A | 3/1991 | Kolouch |
| 5,049,684 A | 9/1991 | Tomibe et al. |
| 5,093,409 A | 3/1992 | Buckmaster |
| 5,114,190 A | 5/1992 | Chalmers |
| 5,186,862 A | 2/1993 | Krijger et al. |
| 5,280,979 A | 1/1994 | Poli et al. |
| 5,326,947 A | 7/1994 | Edds et al. |
| 5,498,644 A | 3/1996 | Reo |
| 5,844,036 A | 12/1998 | Hughes |
| 5,973,903 A | 10/1999 | Tomerlin |
| 6,090,459 A | 7/2000 | Jadamus et al. |
| 6,149,840 A | 11/2000 | Ardakani et al. |
| 6,274,770 B1 | 8/2001 | Clark et al. |
| 6,299,812 B1 | 10/2001 | Newman et al. |
| 6,380,294 B1 | 4/2002 | Babinec et al. |
| 6,521,144 B2 | 2/2003 | Takezawa et al. |
| 6,582,628 B2 | 6/2003 | Kondo et al. |
| 6,638,448 B2 | 10/2003 | Karttunen et al. |
| 6,848,720 B2 | 2/2005 | Carns et al. |
| 6,909,015 B2 | 6/2005 | Kemmish et al. |
| 6,919,394 B2 | 7/2005 | Miyoshi et al. |
| 6,953,619 B2 | 10/2005 | Dean et al. |
| 6,971,682 B2 | 12/2005 | Hoang et al. |
| 6,998,434 B2 | 2/2006 | Wadahara et al. |
| 7,001,556 B1 | 2/2006 | Shambaugh |
| 7,026,388 B2 | 4/2006 | Urata |
| 7,026,432 B2 | 4/2006 | Charati et al. |
| 7,105,596 B2 | 9/2006 | Smalley et al. |
| 7,141,183 B2 | 11/2006 | Hattori et al. |
| 7,153,903 B1 | 12/2006 | Barraza et al. |
| 7,160,980 B2 | 1/2007 | Devine et al. |
| 7,204,940 B2 | 4/2007 | McDonald et al. |
| 7,285,591 B2 | 10/2007 | Winey et al. |
| 7,309,727 B2 | 12/2007 | Elkovitch et al. |
| 7,354,988 B2 | 4/2008 | Charati et al. |
| 7,686,344 B2 | 3/2010 | Fernandez Vieira |
| 2002/0040124 A1 | 4/2002 | Gharda et al. |
| 2002/0145285 A1 | 10/2002 | Katayama et al. |
| 2002/0167173 A1* | 11/2002 | Griffin et al. ................ 285/404 |
| 2002/0183438 A1 | 12/2002 | Amarasekera et al. |
| 2003/0092824 A1 | 5/2003 | Bastiaens et al. |
| 2003/0158323 A1 | 8/2003 | Connell et al. |
| 2004/0134553 A1 | 7/2004 | Ichimura et al. |
| 2004/0135371 A1 | 7/2004 | Masuda et al. |
| 2004/0178626 A1* | 9/2004 | Segreto ........................ 285/47 |
| 2005/0070657 A1 | 3/2005 | Elkovitch et al. |
| 2005/0186378 A1 | 8/2005 | Bhatt |
| 2006/0060004 A1* | 3/2006 | Desrochers et al. ....... 73/863.71 |
| 2006/0069199 A1 | 3/2006 | Charati et al. |
| 2006/0099843 A1 | 5/2006 | Fullner et al. |
| 2006/0166003 A1 | 7/2006 | Khabashesku et al. |
| 2007/0051406 A1 | 3/2007 | Carns et al. |
| 2007/0145190 A1 | 6/2007 | Villegas et al. |
| 2007/0172408 A1 | 7/2007 | Takagi |
| 2007/0213450 A1 | 9/2007 | Winey et al. |
| 2007/0232748 A1 | 10/2007 | Guerret et al. |
| 2008/0013246 A1 | 1/2008 | Berenguer Monge et al. |
| 2008/0015284 A1 | 1/2008 | Cakmak et al. |
| 2008/0048364 A1 | 2/2008 | Armeniades et al. |
| 2009/0071676 A1 | 3/2009 | Fernandez |
| 2009/0215344 A1 | 8/2009 | Lashmore et al. |
| 2010/0003438 A1 | 1/2010 | Bryant et al. |
| 2010/0003840 A1 | 1/2010 | Breah et al. |
| 2010/0084616 A1 | 4/2010 | Brule et al. |
| 2010/0188833 A1 | 7/2010 | Liang et al. |
| 2010/0226063 A1 | 9/2010 | West et al. |
| 2010/0267883 A1 | 10/2010 | Bhatt |
| 2012/0012219 A1 | 1/2012 | Breay et al. |

FOREIGN PATENT DOCUMENTS

| | | |
|---|---|---|
| EP | 1741549 | 1/2007 |
| WO | WO 9941304 | 8/1999 |
| WO | WO 2006/049954 | 5/2006 |
| WO | WO 2006/049956 | 5/2006 |
| WO | WO 2007/100573 | 9/2007 |
| WO | WO 2007/143237 | 12/2007 |
| WO | WO 2008/000854 | 1/2008 |
| WO | WO 2008/047022 | 4/2008 |
| WO | WO 2008/048705 | 4/2008 |
| WO | WO 2010/001238 | 1/2010 |
| WO | WO 2010/044930 | 4/2010 |

OTHER PUBLICATIONS

'PEEK' Wikipedia definition, available at least by Jul. 1, 2008, 1 page.
RTP Co., The Global Leader in Specialty Compounding, Innovation Bulletin, Carbon Nanotube Compounds, © 1995-2007, 5 pages.
RTP Co., The Global Leader in Specialty Compounding, Case Studies: Conductive/Anti-Static Applications, © 1995-2007, 6 pages.
VICTREX®, "PEEK™ Polymers"; http://victrex.com/en/peek-poly/peek-poly.php, available at least by Jul. 1, 2008, 8 pages.
Victrex®, "High Performance Peek Polymers", Materials Properties Guide, available at least by Apr. 8, 2008, 16 6 pages.
Victrex®, "Passion—Innovation—Performance" Processing Guide, A Comprehensive review of the processing guidelines of VICTREX®, PEEK™ high performance polymer, available at least by Jun. 19, 2008, 21 pages.
International Search Report for International (PCT) Application No. PCT/IB2009/006144, mailed Oct. 11, 2009.
International Preliminary Report on Patentability for International (PCT) Patent Application No. PCT/US09/49515, mailed Jan. 13, 2011.
International Search Report for International (PCT) Patent Application No. PCT/US2009/046542, mailed Jan. 21, 2010.
Written Opinion for International (PCT) Patent Application No. PCT/US2009/046542, mailed Jan. 21, 2010.
International Search Report and Written Opinion for International (PCT) Patent Application No. PCT/US09/049515, mailed Jun. 4, 2010 14 pages.
Extended Search Report for European Patent Application No. 09820940.6, dated May 27, 2013 8 pages.
"ASTM Designation: D257-91 Standard Test Methods for D-C Resistance for Conductance of Insulating Materials" American Society for Testing and Materials, Apr. 1991, 18 pages.
Official Action for Canadian Patent Application No. 2,729,864, mailed Sep. 12, 2013, 3 pages.
Njuguna et al., "Polymer Nanocomposites for Aerospace Applications: Fabrication," Advanced Engineering Materials, 2004, vol. 6, Iss. 4, pp. 193-203.

* cited by examiner

DIELECTRIC ISOLATORS

CROSS-REFERENCE TO RELATED APPLICATIONS

This application is a continuation in part of U.S. application Ser. No. 12/166,698, filed on Jul. 2, 2008, entitled "DIELECTRIC ISOLATORS" and is hereby incorporated by reference in its entirety herein.

FIELD OF THE INVENTION

The present application pertains to dielectric isolators for use in fluid conveyance applications and, more particularly, to dielectric isolators that serve to control lightning induced current and allow dissipation of electrostatic charge in aircraft fuel systems.

BACKGROUND

Dielectric fittings or isolators are known in the art and have found use in many applications, ranging from natural gas pipelines, where they isolate monitoring instruments from the effects of electrical current and interrupt cathodic current flow while permitting fluid flow, to providing a conduit for transferring liquid through selected locations as required or aircraft bulkhead structures. In the latter usage, the dielectric fitting contains integral fitting connections on both sides of the aircraft bulkhead that permit connections of tubes, hoses, or other fluid-carrying components. Such a dielectric fitting also provides a high electrical resistance path that limits electrical current flow between the two fitting connections, but allows for the gradual dissipation of electrostatic charge.

Thus, the primary functions of a dielectric fitting, also referred to as a static dissipative isolator, is to dissipate the electrical energy from static charges caused, in part, by fluid movements and to limit electrical current flow caused by the indirect effects of lightning, at such an occurrence. These fittings have the equally important secondary function of providing a safe fluid passage for the fluid passing through the fuel tank or other areas of the aircraft.

SUMMARY

In one embodiment, a fluid carrying element for use in a dielectric isolator is disclosed. The fluid carrying element includes a tube constructed of a composition including PEEK and carbon nanotubes, wherein the tube composition exhibits a bulk volume resistivity from about $10^3$ Ω-cm to $10^{10}$ Ω-cm at an applied potential of 5,000 volts DC.

In another embodiment, a dielectric isolator is disclosed. The dielectric isolator includes a tube constructed of a composition including a thermoplastic organic polymer and carbon nanotubes, and a pair of fittings attached to opposing ends of the tube. In this embodiment, the dielectric isolator exhibits an electrical resistance from about $10^5$ Ω to $10^8$ Ω at an applied potential of greater than 500 volts DC when measured from one fitting to the other fitting.

In another embodiment, an inline-type dielectric isolator for use in an aircraft fuel system is disclosed. The dielectric isolator includes a tube constructed of a composition including PEEK, carbon nanotubes, and carbon fibers, and a pair of ferrules threadingly attached to opposing ends of the tube. In this embodiment, the dielectric isolator exhibits an electrical resistance from about $10^5$ Ω to $10^8$ Ω at an applied potential of greater than 500 volts DC when measured from one ferrule to the other ferrule.

In another embodiment, a bulkhead-type dielectric isolator for use in an aircraft fuel system is disclosed. The dielectric isolator includes a tube constructed of a composition including PEEK, carbon nanotubes, carbon fibers, and chopped glass fiber. The dielectric isolator further includes a pair of ferrules threadingly attached to opposing ends of the tube and a flange threadingly attached to the tube between the ferrules. In this embodiment, the dielectric isolator exhibits an electrical resistance from about $10^5$ Ω to $10^8$ Ω at an applied potential of greater than 500 volts DC when measured from one ferrule to the other ferrule.

In another embodiment, an inline-type dielectric isolator for use in an aircraft fuel system is disclosed wherein the dielectric isolator includes combined threaded and swaged fittings for creating an inline connection in a fuel line thereby eliminating the need for separate coupling devices to mount the isolator in the inline configuration.

In another embodiment, an inline-type dielectric isolator for use in an aircraft fuel system is disclosed wherein the dielectric isolator is especially adapted for use in a fuel line that is covered by an outer protective shroud or sleeve. The isolator in this embodiment includes an inner tubular element that interconnects facing ends of the fuel line and an outer annular portion that interconnects facing ends of the outer shroud. The inner tubular element is sealed to the fuel line by an inner O ring arrangement positioned at each end of the tubular element. The outer annular portion is mounted to the outer sleeve by a pair of couplings each incorporating a positive lock feature. The outer annular portion is also sealed to facing ends of the outer shroud by an outer O ring arrangement positioned at each end of the outer annular portion. With respect to the positive locking feature, the couplings each include a lock nut that is threadably received over an end extension of the isolator, and the couplings each further include a lock ring that releasably engages the corresponding lock nut. The lock rings are biased axially to engage their corresponding lock nut thus achieving the positive locking feature. When the couplings are placed in a locked position, complementary facing surfaces of the lock rings and lock nuts are engaged. These complementary facing surfaces include at least one notch or relief formed on one annular edge of each lock ring or lock nut, and an opposing tab or projection formed on the other facing lock ring/lock nut. When a lock nut is drawn axially toward its corresponding lock ring by threading the lock nut over the end extension of the isolator, the facing surfaces can then snap into a locked position. The notches and tabs are clocked so that a predetermined axial displacement of a lock nut results in the alignment of the notches and tabs for engagement in the locked position. To unlock a coupling, the lock ring can be pulled axially away from the opposing lock nut by overcoming the biasing force of a wave spring incorporated in the lock ring, and then unthreading the lock nut by rotating the same in a direction away from the lock ring. Visual and audio indicators may be provided to confirm positive engagement. A visual indicator in the form of an indicator stripe may be placed on the exposed peripheral surface or rim of the threaded part of each of the end extensions that allows the user to observe whether the corresponding lock nut has been fully threaded over the end extension. Because of the biased arrangement of the lock rings, the audible indicator is the clicking sound produced when a tab engages its corresponding notch.

BRIEF DESCRIPTION OF THE DRAWINGS

It will be appreciated that the illustrated boundaries of elements in the drawings represent only one example of the boundaries. One of ordinary skill in the art will appreciate that a single element may be designed as multiple elements or that multiple elements may be designed as a single element. An element shown as an internal feature may be implemented as an external feature and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

The present application is directed to dielectric isolators for use in aircraft fuel systems to control lightning induced current and allow dissipation of electrostatic charge. The dielectric isolators are configured to have a high enough impedance to limit lightning currents to low levels, but low enough impedance to allow electrostatic charge to dissipate without allowing buildup. Although the dielectric isolators may develop a potential difference across the dielectric length due to the effects of lightning currents and its inherent impedance, they are configured to withstand these induced voltages without dielectric breakdown or performance degradation.

Figure 1A:
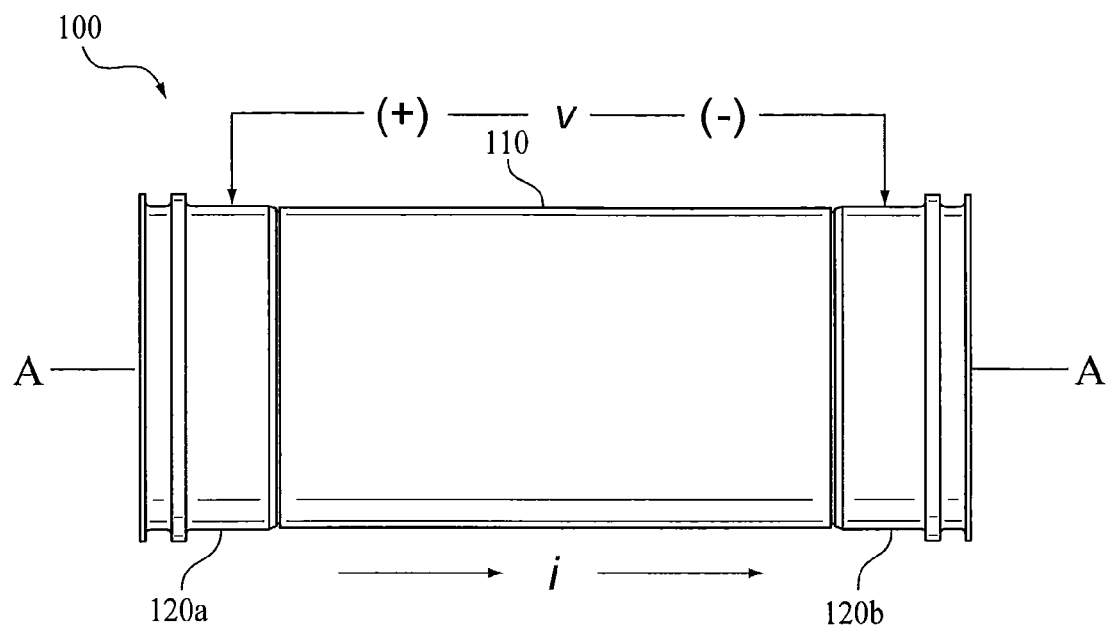
FIGS. 1A and 1B illustrate a top plan and partial cross-sectional views, respectively, of one embodiment of an inline-type dielectric isolator 100.
Figure 1B:
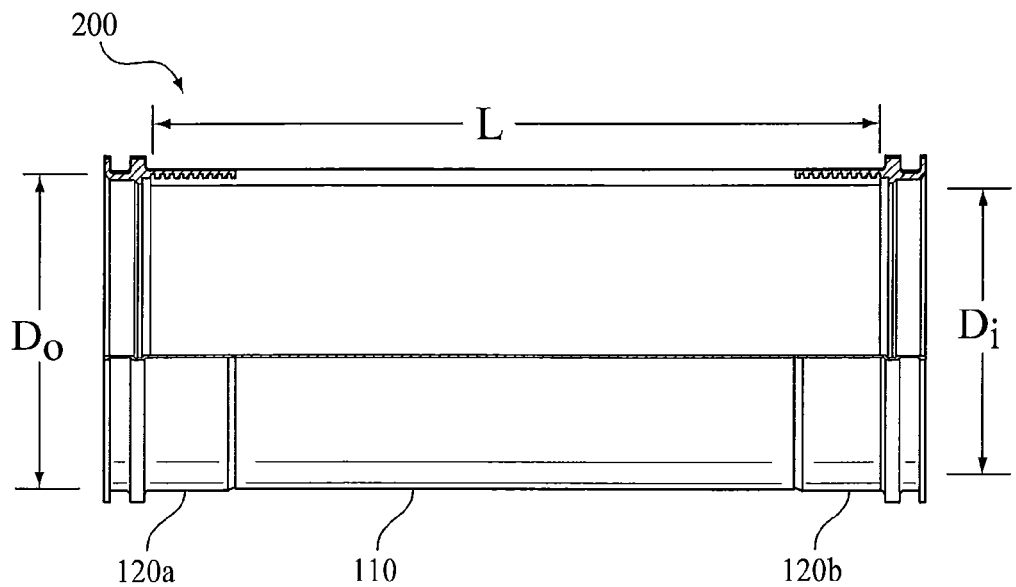

FIGS. 1A and 1B illustrate top plan and partial cross-sectional views, respective, of one embodiment of an inline-type dielectric isolator 100. The dielectric isolator 100 includes a tube 110 for conveying a fluid, such as hydrocarbon aviation fuel or hydraulic oil. In basic dimensions, the tube 110 extends axially to a predetermined length L along a central longitudinal axis A and has an inner diameter $D_i$ and outer diameter $D_o$. As shown in the illustrated embodiment, the tube 110 is cylindrical in shape having a circular cross-section with two opposing ends. It will be appreciated, however, that the tube 110 may be constructed in various other configurations including other cross-sectional shapes and multiple ends.

In one embodiment, the length L of the tube 110 can be from about 3 inches to 5 inches. In another embodiment, the length L of the tube 110 can be from about 2 inches to 9 inches. It will be appreciated, however, that the length can be above or below these ranges depending on the manufacturing technologies available to construct the tubes and depending on system and/or component requirements.

In one embodiment, the inner diameter $D_i$ of the tube 110 can be from about 2 inches to 3 inches. In another embodiment, the inner diameter $D_i$ can be from about 1.5 inches to 4 inches. It will be appreciated, however, that the inner diameter can be above or below these ranges depending on the manufacturing technologies available to construct the tubes depending on system and/or component requirements.

With continued reference to FIGS. 1A and 1B, the dielectric isolator 100 includes a pair of swaged fittings 120a,b attached to opposing ends of the tube 110 that are each configured to be connected to a corresponding coupling (not shown) of a separate component (not shown). It will be appreciated that any type of fitting may be attached to the end of the tube 110 so that the tube 110 can be placed inline with the fuel line. A desired styled fitting may be attached to the ends of the tube so that the tube 110 can be mounted between facing ends of the fuel line. The fittings therefore can be used with a number of different type of fittings to include, without limitation, threaded couplings, quick connect/disconnect couplings, or other types of couplings. Furthermore, the fittings 120a,b are not limited to a specific size and can cover a wide range of both conventional and unconventional sizes.

The fittings 120a,b may be constructed of a metallic material, such as aluminum or stainless steel. In one specific embodiment, the fittings 120a,b are aluminum ferrules that conform to SAE AS5836-1-XX (flex) and SAE AS1656-1-XX (rigid) and are finished with a chemical conversion coat per MIL-C-5541. It will be appreciated that the fitting material is not necessarily limited thereto, provided that the dielectric isolator 100 satisfies the mechanical and electrical requirements of a given installation.

In the illustrated embodiment, the fittings 120a,b are threadingly attached to the ends of the tube 110 via stub ACME threads. Alternatively, the fittings 120a,b can be adhesively bonded to the ends of the tube 110. Although many different types of adhesives may be used, one suitable adhesive that can be used to bond the fittings 120a,b to the ends of the tube 110 is Araldite AV119 distributed by Huntsman Advanced Materials. It will be appreciated that the fittings 120a,b can be attached to the ends of the tube 110 utilizing a variety of other attachment means. For example, the fittings 120a,b can be riveted or swaged onto the ends of the tube 110 for attachment thereto. In all cases, a protective sealant (e.g., MIL-S-81733 or MIL-S-4383) may be applied to the faying surfaces between the fittings 120a,b and the tube 110 to seal the adhesive bond (if present) from outside elements and to protect the metallic fittings 120a,b from galvanic effects (depending on the material from which the tube 110 is constructed).

From a mechanical perspective, the tube 110 in the dielectric isolator 100 serves as a fluid carrying element to permit fluid to flow therethrough. However, from an electrical perspective, the tube 110 in the dielectric isolator 100 also serves as a resistor having a high and robust electrical impedance to limit indirect currents associated with lightning events to low levels across the dielectric isolator 100, but low enough surface impedance to allow electrostatic charge to dissipate without allowing buildup. In other words, the tube 110 allows enough surface current i to flow therethrough to prevent electrostatic charge build up due to fluid flow through the fuel line, yet limits the flow of current i associated with voltage v therethrough during a lightning strike to current levels that are relatively low and safe for the aircraft fuel system.

Because lightning isolation requires electrical robustness, the tube 110 must exhibit high resistance even after repeated exposure to high voltages. Some materials experience high voltage conditioning when exposed to high voltages such as those encountered in lighting isolation applications. High voltage conditioning is a phenomenon that substantially decreases the effective resistance of a material after exposure to high voltages. Collapse in the effective resistance of the material increases the conductivity of the material, causing the material to substantially lose its isolator properties.

Accordingly, the tube 110 is constructed of an appropriate material that enables the tube 110 to be conductive enough to dissipate electrostatic charge build up associated with fuel flow through and over the tube 110, while at the same time enabling the tube 110 to be resistive enough to prevent the flow of electrical current therethrough associated with lightning events. Additionally, the tube composition needs to be effectively immune to high voltage conditioning for the reasons discussed above. In other words, the tube material must maintain acceptable electrical performance after being subjected to repeated lightning strike events.

To meet these electrical requirements, the tube 110 may be constructed of a composition that includes a thermoplastic organic polymer, carbon nanotubes, and, optionally, other conductive carbon materials. In order to accommodate high voltage events, such tube compositions exhibit a bulk volume resistivity of about $10^3$ $\Omega$-cm to $10^{10}$ $\Omega$-cm at an applied potential of 5,000 volts DC. Other voltages such as 1,000 volts DC or 10,000 volts DC may also be used, and the corresponding resistivity determined, however the resistivity should be approximately in the dissipating to insulating range, as described below.

Thermoplastic compositions that are subjected to high voltages tend to suffer degradation in their resistivity properties over time, in as little as one cycle when subjected to high voltage, or even during the ramp up to a high voltage. Thus, the tube compositions d herein are prepared to withstand high voltage events and maintain their resistivity properties. The phrase "bulk volume resistivity degradation," is used to refer to one measure of the overall degradation in resistivity due to high voltage events.

The bulk volume resistivity degradation of a composition is determined at a specified voltage (e.g. 100 volts DC, 500 volts DC, 1,000 volts DC, 5,000 volts DC, or other predetermined voltage), after a specified number of cycles. Such resistivity changes may be referred to as a five-strike bulk volume resistivity degradation, where five is the specified number of cycles. For example, a five-strike bulk volume resistivity degradation at 5,000 volts DC would be determined by subjecting the material to cycling between zero and 5,000 volts DC for five cycles, and measuring the resistivity at 5,000 volts DC during the first and fifth cycles. Desirably, the present compositions exhibits a five-strike bulk volume resistivity degradation of no more than a 20× factor after being cycled between zero and the specified voltage. In some embodiments, the compositions exhibit a five-strike bulk volume resistivity degradation of no more than a 15×, 10×, or even a 5× factor after being cycled between zero and the specified voltage, e.g., 5,000 volts DC. For example, if the maximum degradation is a 20× factor and the initial determination at the specified voltage is a bulk volume resistivity of $6\times10^8$ $\Omega$-cm, the bulk volume resistivity would be no less than $3\times10^7$ $\Omega$-cm at the fifth cycle. In other embodiments, the present compositions may exhibit a five-strike bulk volume resistivity degradation of no more than 50% after being cycled between zero and the specified voltage, e.g., after being cycled five (5) times between zero and 5,000 volts DC. In some embodiments, the present compositions exhibit a five-strike bulk volume resistivity degradation of no more than a 25%, 10%, 5%, or even as low as a 2% after being cycled between zero and the specified voltage, e.g., 5,000 volts DC. For example, when the composition exhibits a maximum degradation in its five-strike bulk volume resistivity degradation of no more than a factor of 50%, if the initial determination at the specified voltage is a bulk volume resistivity of $6\times10^8$ $\Omega$-cm, the bulk volume resistivity would be no less than $3\times10^8$ $\Omega$-cm at the fifth cycle; correspondingly for a maximum degradation of 25%, the bulk volume resistivity would be no less than $4.5\times10^8$ $\Omega$-cm at the fifth cycle.

As used herein, volume resistivity is the resistance (ohm-cm) to leakage current through the body of an insulating material. As used herein, surface resistivity (ohms per square) is defined as the resistance to leakage current along the surface of an insulating material. As the surface/volume resistivity increases, the leakage current and the conductivity of the material decrease.

As a reference point for volume resistivity, conductive materials such as metals are those materials having a volume resistivity of less than $1\times10^{-4}$ $\Omega$-cm. In conductive materials, charges go to ground or to another conductive object that the material is in close proximity to or contacts. Electrostatic shielding materials have a volume resistivity of less than $1\times10^3$ $\Omega$-cm, but greater than or equal to $1\times10^{-4}$ $\Omega$-cm. Dissipative materials have a volume resistivity of from about $1\times10^3$ $\Omega$-cm to $1\times10^{10}$ $\Omega$-cm. For these materials, the charges flow to ground more slowly and in a somewhat more controlled manner than with conductive materials. For ESD-sensitive (electrostatic discharge) devices, these materials provide Faraday cage protection from energy transfer. Insulative materials are defined as those having a volume resistivity of at least $1\times10^{10}$ $\Omega$-cm. Insulative materials prevent or limit the flow of electrons across their surface or through their volume, have a high electrical resistance, and are difficult to ground. Static charges remain in place on insulative materials for an extended period of time. Table 1 sets forth volume and surface resistivities for the above materials.

TABLE 1

Volume and Surface Resistivities for Material Types.

| Material Type | Surface Resistivity ($\Omega$/sq) | Volume Resistivity ($\Omega$-cm) |
|---|---|---|
| Conductive | $<1\times10^{-4}$ | $<1\times10^{-4}$ |
| Electrostatic shielding | $\geq1\times10^{-4}, <1\times10^4$ | $\geq<1\times10^{-4}, <1\times10^3$ |
| Dissipative | $\geq1\times10^6, <1\times10^{11}$ | $\geq1\times10^3, <1\times10^{10}$ |
| Insulative | $\geq1\times10^{11}$ | $\geq=1\times10^{10}$ |

As discussed above with respect to strike resistivity degradation, the tube compositions disclosed herein do not exhibit electrical "burn-in," or at least exhibit a substantially reduced "burn-in" as compared to other materials. "Burn in" refers to a phenomenon where materials, once exposed to a high voltage, do not return to their initial electrical resistance, but instead exhibit a reduced resistance. Compounds formulated without carbon nanotubes tend to display such a "burn in" phenomenon. However, surprisingly, the tube compositions disclosed herein containing carbon nanotubes, eliminate, or at least substantially reduce, such "burn in." Without being bound by theory, it is believed that compositions without carbon nanotubes, or high carbon nanotube loadings, are susceptible to material degradation and ionization when exposed to high voltages. Whereas, in the tube compositions disclosed herein, the carbon nanotubes provide an electrical conduit through the polymer matrix, when the compositions are exposed to a high voltage, such that ionization and degradation of the polymer matrix are avoided or at least substantially reduced. In other words, at high applied potentials, the compositions act as electrostatic dissipaters that allow a controlled release of a static charge build-up, thereby preventing, or at least substantially reducing, arcing or rapid discharge. Eliminating or substantially reducing the potential for generation of a spark from the compositions or the materials to which they are in contact, helps to reduce the risks for harm to the surrounding environment and people in close proximity to such a charge.

As discussed above, the tube compositions disclosed herein are insulative at low applied potentials, but is mildly conductive, i.e., the composition become dissipative, at high applied potentials. Thus, in one embodiment, by utilizing ASTM D-257, the tube composition is determined to be an insulator. As such, at an applied potential of 100 volts DC, the tube composition exhibits a volume resistivity of greater than or equal to $10^9$ Ω-cm and, more typically, at least about $10^{10}$ Ω-cm. However, in other embodiments, the tube compositions, at potentials of 1,000 volts DC, or greater, exhibit a volume resistivity of about $10^3$ Ω-cm to $10^{10}$ Ω-cm. The use of the standard protocol and specimen size with voltages higher than 100 volts DC, for example, over 1,000 volts DC, are referred to as a "modified ASTM D-257 protocol." In one embodiment, a modified ASTM D-257 protocol results in the measurement of the bulk volume resistivity of the tube composition at 5,000 volts DC. The tube compositions disclosed herein desirably exhibit a bulk volume resistivity of about $10^6$ Ω-cm to $10^{10}$ Ω-cm at 5,000 volts DC.

ASTM D-257 is a standardized method for determining surface and volume resistivity of a material. Briefly, according to this method, a standard size specimen is placed between two electrodes, and a voltage is then applied for sixty seconds and the resistance is measured. Surface or volume resistivity is calculated, and apparent value is given for the sixty second electrification time. The method is well known and the full standard is available from ASTM International, West Conshohocken, Pa. In the determinations referred to in the present application, standard specimens having a standard ASTM D3801 flame bar shape and dimensions of 6"×0.5"×0.125" were formed from the present tube composition by injection molding.

In one embodiment, the thermoplastic organic polymer used in the tube composition is polyetheretherketone (PEEK). PEEK and other polyetherketones or polyetherketoneketones are described in patents such as EP 0 001 879, U.S. Pat. No. 6,909,015, and U.S. Pat. No. 6,274,770. The thermoplastic polymer may be present in the tube composition from about 50 wt % to 98 wt % in some embodiments, from about 55 wt % to 95 wt % in other embodiments, or from about 60 wt % to 90 wt % in yet other embodiments.

Without being bound to a single example, one commercially available PEEK is Victrex 150 P available from Victrex USA, West Conshohocken, Pa. This PEEK material is commercially available as a powder that is a low viscosity grade of PEEK for use in extrusion compounding. PEEK is commercially available in a number of other grades and forms ranging from low medium and standard viscosity grades to easy flow and general purpose grades. The various grades of PEEK are known and all are flame resistant, and insulative. PEEK also exhibits wear resistance, low friction, and good chemical resistance, particularly to various fuels and other hydrocarbons. Aromatic PEEK, such as 4-(4-(4-oxyphenoxy)-phenoxy)-benzoyl polyetheretherketone, may be processed via extrusion or injection molding at polymer temperatures of about 360° C. to 400° C.

In other embodiments, the thermoplastic organic polymer used in the tube composition can include other polymers typically used in injection molding applications. For example, such polymers include, but are not limited to, polyacetal, polyacrylic, polyalkylene terephthalate, polyalkylene terephthalate glycol, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyetheretherketone, polyetherketoneketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, polybutylene terephthalate, polyethyleneterephthalate glycol, or a blend of any two or more.

Carbon nanotubes, suitable for use in the tube composition, include both multi-wall and single wall nanotubes. Carbon nanotubes may be prepared using a variety of techniques, including, but not limited to, arc discharge, laser ablation, high pressure carbon monoxide (HiPCO), chemical vapor deposition (CVD), and catalytic chemical vapor deposition (CCVD). Such techniques may utilize vacuum techniques or processing gases. Carbon nanotubes can be of a wide variety of sizes. Single-walled carbon nanotubes have a shape that is reminiscent of a tube made by rolling a sheet of paper one time such that opposite's sides of the sheet meet and abut one another. Whereas multi-walled tubes have a shape that is reminiscent of a scrolled sheet of paper, or chicken wire, that is rolled multiple times. The inner core region of the carbon nanotube may be hollow, or may comprise carbon atoms which are less ordered than the ordered carbon atoms of the outer region. As used herein, the phrase "ordered carbon atoms," refers to graphitic domains having their c-axes substantially perpendicular to the cylindrical axis of the carbon nanotube. The individual graphitic carbon layers are concentrically arranged around the long axis of the fiber like the growth rings of a tree, or like a scroll of hexagonal chicken wire. There is usually a hollow core a few nanometers in diameter, which may be partially or wholly filled with less organized carbon. Each carbon layer around the core may extend as much as several hundred nanometers. The spacing between adjacent layers may be determined by high resolution electron microscopy, and in some embodiments is only slightly greater than the spacing observed in single crystal graphite, i.e., from about 0.339 to 0.348 nanometers.

The term "carbon nanotubes" refers to an essentially cylindrical, discrete carbon tube, on the nanometer scale. Single-walled carbon nanotubes typically have a substantially constant diameter from about 2 nm to 100 nm. For example, from about 3 nm to 75 nm, from about 4 nm to 50 nm, from about 4 nm to 25 nm, or from about 5 nm to 15 nm, according to various embodiments. In one embodiment, the carbon nanotubes have a diameter from about 3.5 nm to 70 nm. The length of the carbon nanotubes may also vary and may cover a range from hundreds of nanometers to the micron range. Typically, the length of a carbon nanotube is greater than about 100 times the diameter. For example, carbon nanotubes may have a length from about 100 nm to 10 µm, from about 500 nm to 5 µm, from about 750 nm to 5 µm, from about 1 µm to 5 µm, or from about 1 µm to 2 µm, according to various embodiments. An outer region of single-walled or multi-walled nanotubes is made of essentially continuous layers of ordered carbon atoms and a distinct inner core region. In multi-walled tubes, each of the layers and core is disposed substantially concentrically about the cylindrical axis of the carbon nanotube. Preferably, the entire carbon nanotube is substantially free of thermal carbon overcoat.

As used herein, the term "cylindrical" is used herein in the broad geometrical sense, i.e., the surface traced by a straight line moving parallel to a fixed straight line and intersecting a curve. A circle or an ellipse are but two of the many possible curves of the cylinder.

The purity of the carbon nanotubes may also play a role in the effectiveness of the carbon nanotubes in the tube composition. The carbon nanotubes may have a purity of greater than 50%, in some embodiments, of greater than 60%, in some embodiments, of greater than 70%, in some embodiments, of greater than 80%, in some embodiments, or of greater than 90%, in still other embodiments. Typically, the carbon nanotubes, due to manufacturing methods, contain metal oxide impurities. While the metal oxide impurities may or may not affect tube composition performance in some embodiments, the metal oxide content of the carbon nanotubes is less than 50%. In other embodiments, the metal oxide content of the carbon nanotubes is less than 60%, less than 40%, less than 30%, or less than 20%. In still other embodiments, the carbon nanotubes have less than 10% metal oxide impurities.

The carbon nanotubes may be present in the tube composition from about 0.05 wt % to 2 wt % in some embodiments, from about 0.1 wt % to 1 wt % in other embodiments, or from about 0.2 wt % to 0.5 wt % in yet other embodiments. In some embodiments, the tube composition have from about 0.2 wt % to 0.4 wt %, or from about 0.25 wt % to 0.35 wt %.

As discussed above, the tube composition may optionally include other carbon materials such as graphite, carbon black, carbon fiber, and/or milled carbon fiber as another conductor in addition to the carbon nanotubes. In one embodiment, the conductive carbon material is milled carbon fiber. The length of the carbon fibers may vary widely. In some embodiments, the average length of the milled carbon fibers is no more than about 0.5 mm. In other embodiments, the average length of the milled carbon fibers is no more than 0.2 mm. The milled carbon fibers are present in the tube composition from 0 wt % to 20 wt % in some embodiments, from about 1 wt % to 10 wt % in other embodiments, or from about 4 wt % to 12 wt % in yet other embodiments.

The tube composition may contain a variety of other materials that may impact a variety of properties. For example, in some embodiments, the tube composition includes a reinforcement material such as glass fiber to provide rigidity and strength to parts or devices prepared from the tube composition. In some embodiments, the glass fiber is present in the tube composition from 0 wt % to 60 wt %, from about 5 wt % to 60 wt % in other embodiments, or from about 15 wt % to 40 wt % in yet other embodiments.

The tube compositions provided herein are amenable to injection molding processes. After compounding, the tube composition extrudate exits the extruder as a spaghetti-like material that is cooled and cut into small pieces for ease of handling, quick packaging and/or convenient shipping. Alternatively, bulk material could be extruded and used in a bulk process. An injection molding apparatus may then be charged with the extrudate and molded into parts or devices that may be used as is, or require additional machining to refine the device into a useable part. For example, tubing, connectors, threaded connectors, etc. may be prepared by injection molding processes.

Methods of preparing the tube composition are also provided. Methods may include blending all ingredients that will form the tube composition in a hopper and extruding the mixture. Alternatively, the methods may include several steps with the various ingredients being added at any given point in the process. For example, a first amount of a thermoplastic polymer may be compounded with carbon nanotubes in an extruder to produce a first extrudate. The first extrudate may then be blended with glass fiber, carbon fiber, and/or milled carbon fiber and subjected to a second extrusion to produce a second extrudate that is a tube composition. Compounding may take place in a single screw, twin screw, or other style extruder. The methods may also include tumbling all the ingredients of any particular stage of the preparation, prior to being fed to the extruder.

In preparing the tube composition, the same thermoplastic polymer may be used in the preparation of both the first and second extrudates, or different thermoplastic polymers may be used. If different thermoplastic polymers are used in the steps, they may be chemically distinct polymers, or just different grades of the same polymer having varying viscosities, melt indices, or other polymeric properties.

With reference back to FIGS. 1A and 1B, the tube 110 can be manufactured using a variety of manufacturing processes. For example, in a specific embodiment, the tube 110 is injection molded to a desired diameter and length. Alternative manufacturing processes that can be used to make the tube 110 include extruding and roto-molding (also referred to as compression molding).

When the dielectric isolator 100 is used in an aircraft fuel system, it needs to satisfy certain dielectric and lightning strike performance requirements. With respect to dielectric performance requirements, in one embodiment, the dielectric isolator 100 exhibits an electrical resistance of from about $10^5 \Omega$ to $10^8 \Omega$ when measured from end to end at an applied potential of 500 volts DC or greater, with one test probe located on the outside surface of one swaged fitting, (e.g., fitting 120a) and another test probe located on the other swaged fitting (e.g., fitting 120b). Of course, when used in aircraft fuel systems, the dielectric isolator 100 is expected to exhibit this resistance range from initial installation to the aircraft end of life. Moreover, it will be appreciated that the electrical resistance range may be different depending on the desired application.

With respect to lightning strike performance requirements, in one specific embodiment, the dielectric isolator 100 should not exhibit electrical arcing or sparking, either internally or externally, or voltage/current waveform collapse during and after exposure to multiple (e.g., between ten and thirty) voltage pulses, in either (±) polarity, having peak amplitude of 9,000 volts that conform to voltage waveform B in accordance with SAE ARP5412. This simulated lightning strike testing is performed per ARP5416 where one test probe is located on the outside surface of one fitting (e.g., fitting 120a) and another test probe is located on the other fitting (e.g., fitting 120b). It will be appreciated that the lightning strike performance requirements may be different depending on the desired application.

To verify electrical robustness, the electrical resistance of the dielectric isolator 100 is measured after exposure to each and every simulated lightning test to verify that the electrical resistance remains within the desired range.

Figure 2:
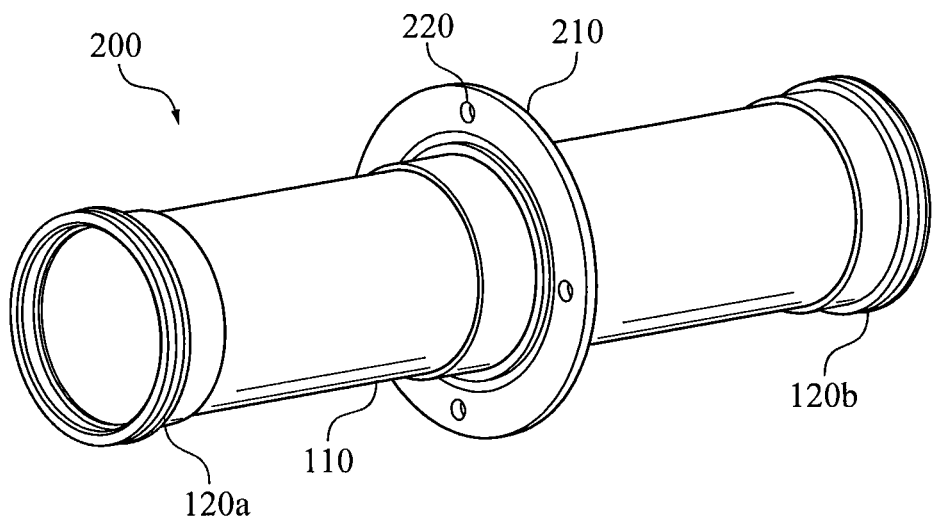
FIG. 2 illustrates a perspective view of one embodiment of a bulkhead-type dielectric isolator 200.
Figure 3:
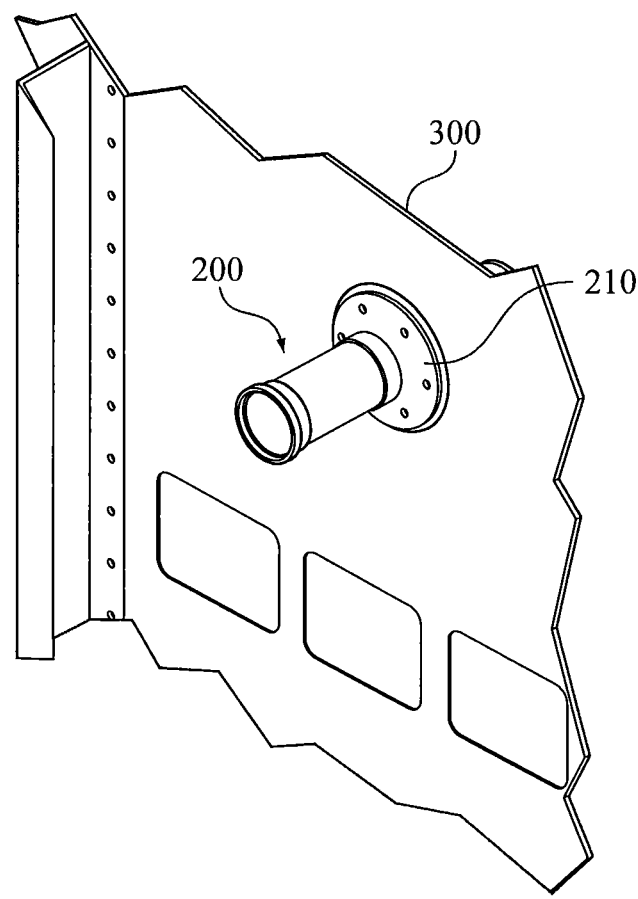
FIG. 3 illustrates a perspective view of the bullhead-type dielectric isolator 200 attached to a bulkhead 300.

FIG. 2 illustrates a top plan view of another embodiment of dielectric isolator 200. The dielectric isolator 200 is substantially similar to the inline-type dielectric isolator 100 described above and illustrated in FIG. 1 (structure and material), with the exception that it includes a flange 120 attached to the tube 110 between the fittings 120a,b. The dielectric isolator 200 can be characterized as a bulkhead-type dielectric isolator because the flange 120 permits the dielectric isolator 200 to be attached to a bulkhead 300 of a vessel, such as an aircraft fuel tank, as shown in FIG. 3. To facilitate attachment to the wall 300, the flange 120 includes multiple holes 220 for receiving bolts or other types of fasteners.

The flange 120 can be constructed of a metallic material, such as aluminum or stainless steel. However, it will be appreciated that the flange material is not necessarily limited thereto, provided that the dielectric isolator 100 satisfies the mechanical and electrical requirements of a given installation.

In the illustrated embodiment, the flange 120 is threadingly attached to the ends of the tube 110 via stub ACME threads. Alternatively, the flange 120 can be adhesively bonded to the tube 110. Although many different types of adhesives may be used, one suitable adhesive that can be used to bond the flange 120 to the tube 110 is Araldite AV119 distributed by Huntsman Advanced Materials. It will be appreciated that the flange 120 can be attached to the tube 110 utilizing a variety of other attachment means. For example, the flange 120 can be riveted onto the tube 110 for attachment thereto. In all cases, a protective sealant (e.g., MIL-S-81733 or MIL-S-4383) may be applied to the faying surfaces between the flange 120 and the tube 110 to seal the adhesive bond (if present) from outside elements and to protect the flange 120 from galvanic effects (depending on the material from which the tube 110 is constructed).

When the dielectric isolator 200 is used in an aircraft fuel system, it needs to satisfy certain dielectric and lightning strike performance requirements. With respect to dielectric performance requirements, in one specific embodiment, the dielectric isolator 200 exhibits an electrical resistance of from about $10^5 \Omega$ to $10^8 \Omega$ when measured from end to end at an applied potential of 500 volts DC or greater, with one test probe located on the outside surface of one fitting (e.g., fitting 120a) and another test probe located on the flange 210. Of course, when used in aircraft fuel systems, the dielectric isolator 200 is expected to exhibit this resistance range from initial installation to the airplane end of life. Moreover, it will be appreciated that the electrical resistance range may be different depending on the desired application.

With respect to lightning strike performance requirements, in one specific embodiment, the dielectric isolator 200 should not exhibit electrical arcing or sparking, either internally or externally, or voltage/current waveform collapse during and after exposure to multiple (e.g., between ten and thirty) voltage pulses, in either (±) polarity, having peak amplitude of 9,000 volts that conform to voltage waveform B in accordance with SAE ARP5412. This testing is be performed per ARP5416 where one test probe is located on the outside surface of one fitting (e.g., fitting 120a) and another test probe is located on the flange 210. It will be appreciated that the lightning strike performance requirements may be different depending on the desired application.

Figure 4:
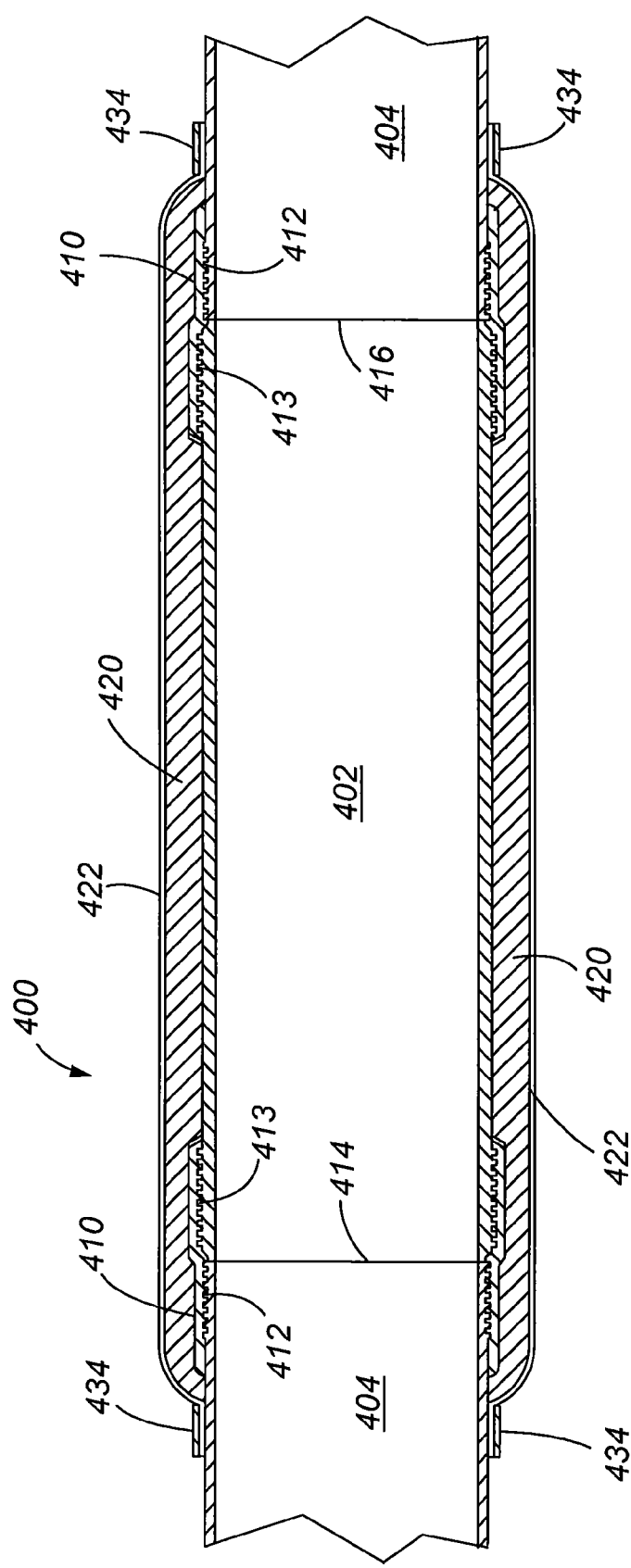
FIG. 4 illustrates a fragmentary perspective view of an inline-type dielectric isolator 400 in another embodiment.

FIG. 4 illustrates another preferred embodiment of the present invention in the form of another inline configured dielectric isolator 400. The dielectric isolator 400 includes a dielectric tube 402 that interconnects facing ends of a fluid conveying line such as a fuel line 404. In this embodiment, the tube 402 is connected to the facing ends of the fuel line 404 as by a pair of swaged fittings 410. Each of the fittings 410 have a first end with internal threads 413, and an opposite end with internal swaging grooves 412. The fittings 410 are swaged to the facing ends of the fuel line 404 as shown. The internal threads 413 are threadably received over a complementary set of outer threads formed on the ends of the outer surfaces of the tube 402. A sealant (not shown) coats the threads 413 so that the tube 402 is sealed to the fittings 410. One example of a sealant may include a silicone based sealant. As shown, one end 416 of the tube 402 abuts the facing end of the fuel line 404 while the other end 414 of the tube 402 abuts the other facing end of the fuel line 402. The swaged and threaded fittings 410 eliminate the need for couplings to secure the tube 402 in line, thereby reducing weight and materials used in incorporating the dielectric isolator 400 inline with the fuel line 404.

The embodiment of FIG. 4 also shows a fireproof insulation wrap that covers the tube 402 and the fittings 410. The fireproof insulation wrap includes a fireproof material 420 housed within a cover 422. A pair of metallic straps 434 may be used to secure the opposing ends of the insulation wrap to the fuel line 404. The straps may be secured as by crimping or other known means. One example of an acceptable material for use as the fireproof insulation wrap includes Rishon® manufactured by RCF Technologies.

Figure 5:
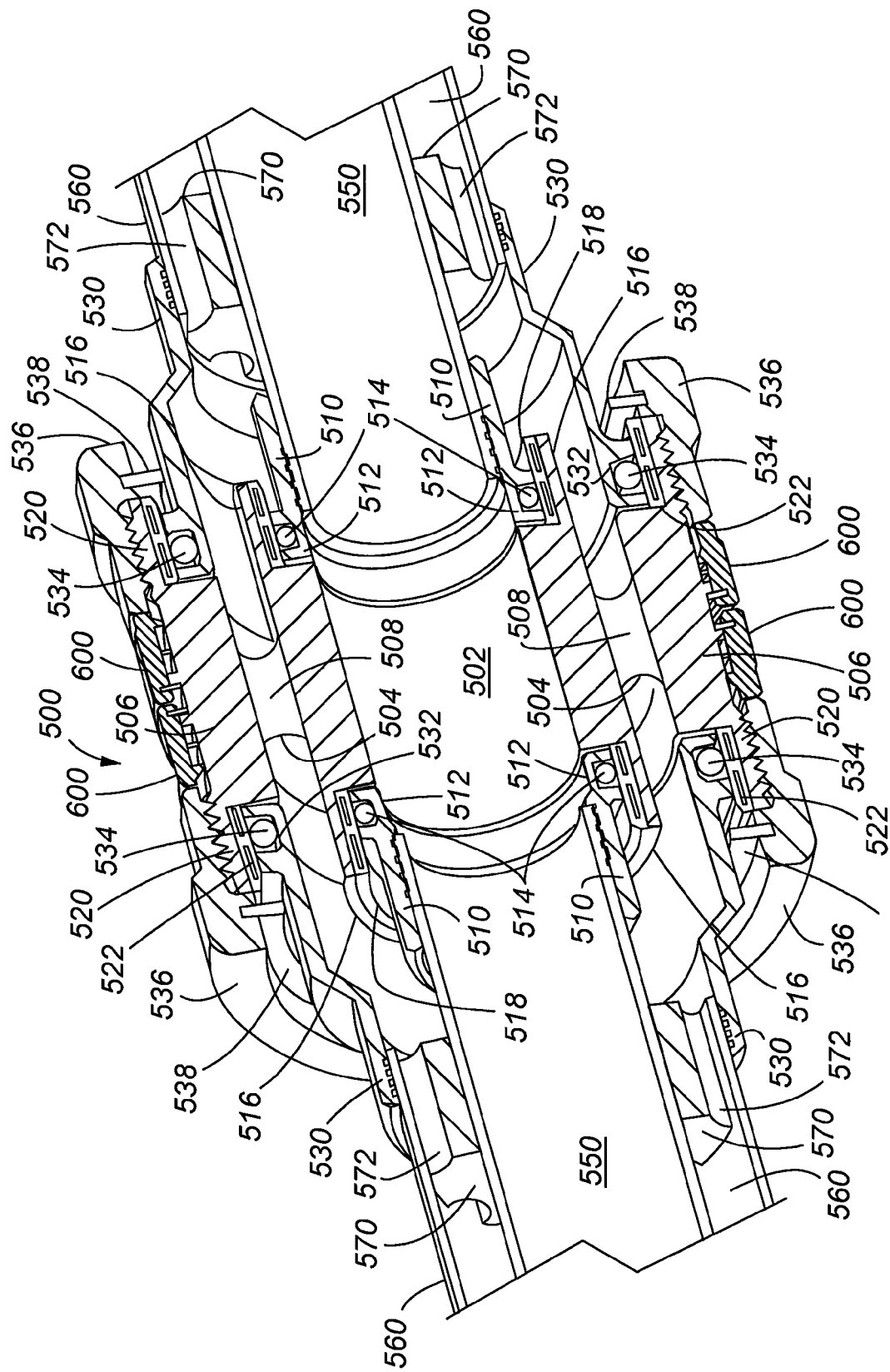
FIG. 5 illustrates a perspective cross-sectional view of an inline-type dielectric isolator 500 in another embodiment.
Figure 6:
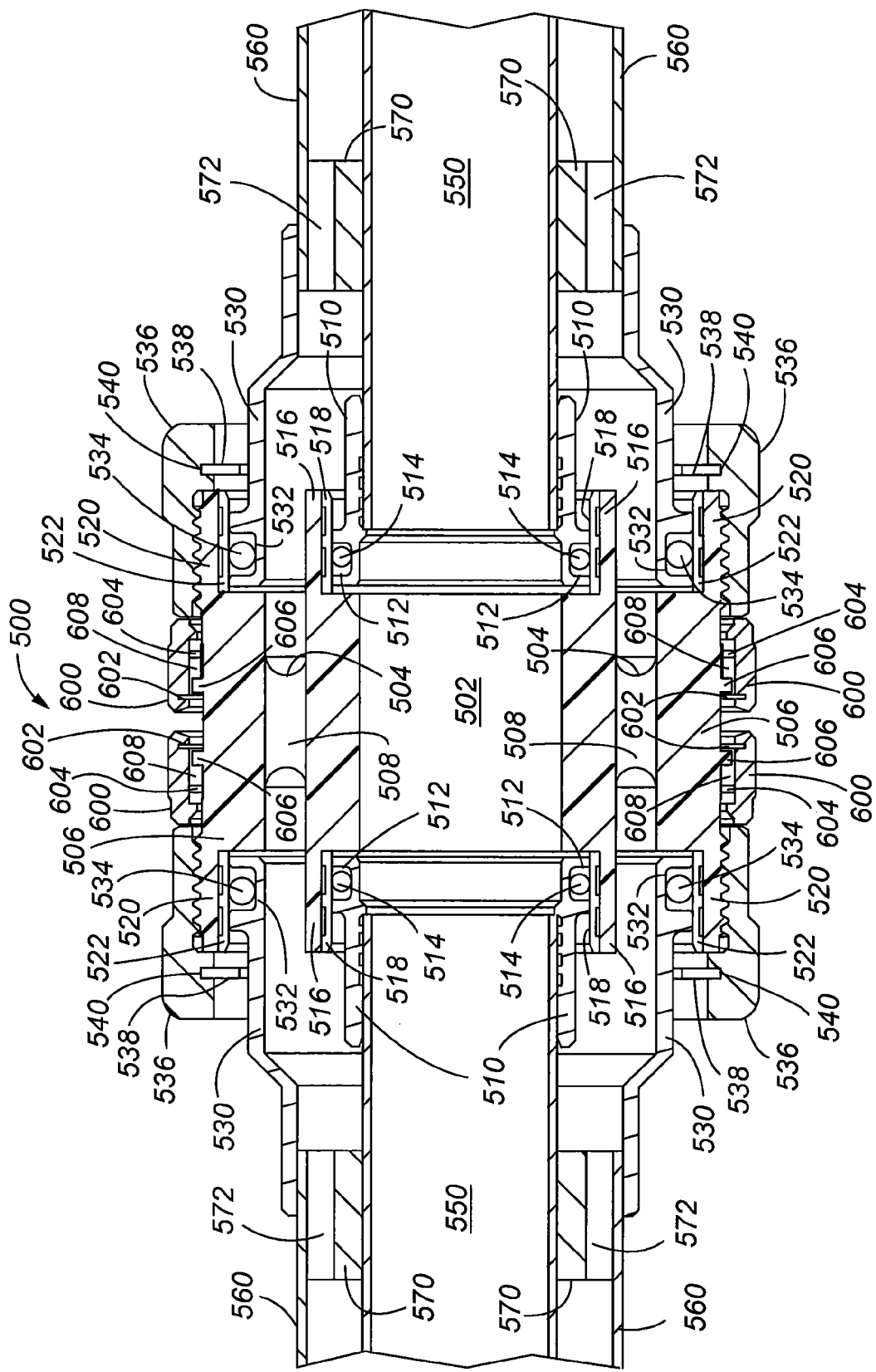
FIG. 6 illustrates another cross sectional view of the inline-type dielectric isolator 500 of FIG. 5.

Referring to FIGS. 5 and 6, the dielectric isolator 500 in this embodiment comprises an isolator 500 that joins two separate elements, namely, a fluid carrying element such as a fuel line 550, and an outer protective sleeve/shroud 560. Some fuel lines must be encased or protected within an outer shroud in the event of a fuel leak in which escaping fluid is collected in the annular gap between the shroud and fuel line. The escaped liquid is collected within a container or sump that is typically located at the lowest area within the fuel line system. The shroud 560 as shown is a tubular member designed to convey fluid. Thus, the same concerns exist with respect to this shroud 560 in terms of a requirement for dissipating electrical energy to prevent buildup of a static charge. Accordingly, the isolator 500 in this embodiment is especially adapted to simultaneously isolate static charge that may be present both in the fuel line 550 and the shroud 560. The isolator 500 is an integrally formed, one-piece structure that is capable of achieving this dual requirement and also accommodates the normal configuration of a fuel line and protective outer sheath. Thus, dual isolation can be achieved without further modifying the fuel system other than to incorporate the isolator at a chosen inline location.

The isolator 500 comprises an inner tubular element 502 that interconnects facing ends of a fuel line 550, and an outer annular portion 506 that interconnects opposing ends of an outer sleeve/shroud 560. A circumferential web 504 interconnects the inner tubular element 502 with the outer annular member 506. A plurality of circumferentially spaced and longitudinally extending openings 508 extend through the web 504 that enables any fluid that collects within the annular gap between the fuel line 550 and shroud 560 to be conveyed to the sump (not shown). A plurality of spacers 570 are used to stabilize the fuel line 550 within the outer shroud 560. These spacers 570 also include a plurality of circumferentially spaced gaps/openings 572 that allow liquid accumulating in the annular gap to be conveyed to the sump.

The inner tubular element 502 attaches to facing ends of the fuel line 550 in a sealed configuration by incorporation of O rings held in inner fittings 510. Each of the inner fittings 510 are secured at one end to their respective fuel lines 550 as by swaging. The opposite ends of the fittings 510 each include a peripheral groove 512 that receives an O ring 514. Each end of the tubular element 502 includes an end extension 516. The end extensions 516 of the inner tubular element 502 form annular cavities that receive inner protective rims 518. The inner protective rims 518 are made of a metallic material. The O rings 514 are captured in the annular cavities and make sealing contact with the protective rims 518. The protective rims 518 provide a reliable sealing surface for the O rings. Frictional contact of the O rings if in direct contact with the composite material could potentially roughen the surface of the composite material in a manner preventing an adequate seal. Thus, the protective rims 518 help to maintain a reliable sealing surface over time. The outer annular member 506 is connected and sealed to the outer shroud 560 in the same manner as sealing engagement is achieved with respect to the inner tubular element 502 and the fuel line 550. More specifically, outer fittings 530 interconnect the facing ends of the outer shroud 560 to the outer annular member 506. Like inner fittings 510, outer fittings 530 are swaged on one end and incorporate an O ring at the opposite end. Accordingly, fittings 530 are swaged to the facing ends of the shroud 560 and the fittings 530 each include a peripheral groove 532 that receive a corresponding outer O ring 534. The outer annular member 506, like the inner tubular element 502, includes end extensions 520 located at opposite ends of the member 506. Outer protective rims 522 are received in the annular cavities formed by the end extensions 520 of the outer annular member 506. The outer O rings 534 make sealing engagement with the protective rims 522.

Figure 6B:
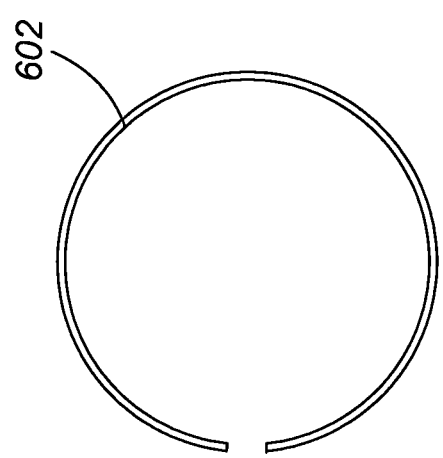
FIG. 6B a side view of another component used in the locking feature of the isolator, namely, an annular wave spring used to bias engagement of a lock nut to a corresponding lock ring.
Figure 6A:
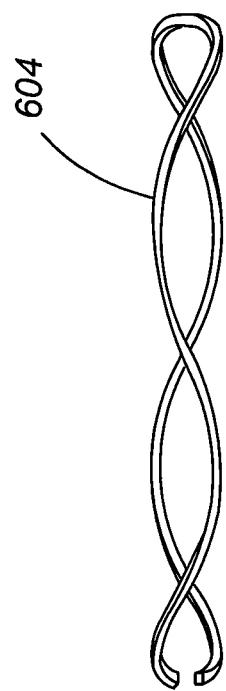
FIG. 6A is a plan view of a component used in a locking feature of the isolator in the embodiment of FIGS. 5 and 6, namely, an annular split ring used to retain a lock ring in engagement with a portion of the isolator.

Outer couplings are used to removably secure the isolator 500 to the shroud 560. As shown, a pair of couplings is provided to assemble the isolator. Each coupling includes a lock nut 536 and a corresponding lock ring 600. Each of the lock nuts 536 are threaded over their corresponding threaded end extension 520, and the lock rings 600 are positioned in the space between the lock nuts. The outer annular member 506 at the location of the lock rings includes a pair of annular protrusions 606 that are received in the interior annular portions of the lock rings. Each of the lock rings 600 also receives a corresponding split ring 602 that abuts the adjacent protrusion 606. Each split ring is more specifically received in an annular groove formed on the interior of the corresponding lock ring, and the split ring thereby holds the lock ring in place. In order to axially bias the lock ring 600 over the outer annular member 506, the lock ring further receives an annular wave spring 604 that is received in the gap 608 (see FIG. 6) located between the most exterior surface of the member 506 and the interior surface of the lock ring 600. FIGS. 6A and 6B illustrate a lock ring 602 and a wave spring 604, respectively. The wave spring 604 traverses the gap 608 so that the wave spring simultaneously contacts points along the facing surface of the protrusion 606 and the opposing interior surface of the lock ring 600 thereby biasing the lock ring 600 against axial displacement along the member 506. The couplings each further include an axial delimiting displacement ring 538 that is used to prevent excessive axial displacement of the corresponding outer fitting 530. During operation, pressure from fluid within the isolator will cause some axial displacement of the fittings 530 away from the isolator. In order to prevent loss of sealing engagement of the O rings against their corresponding protective rims, axial displacement of the fittings 530 must be limited as achieved by the rings 538. As shown, the rings 538 are each received within their corresponding peripheral grooves 540 formed on the interior surface of the outer couplings 536.

Figure 7:
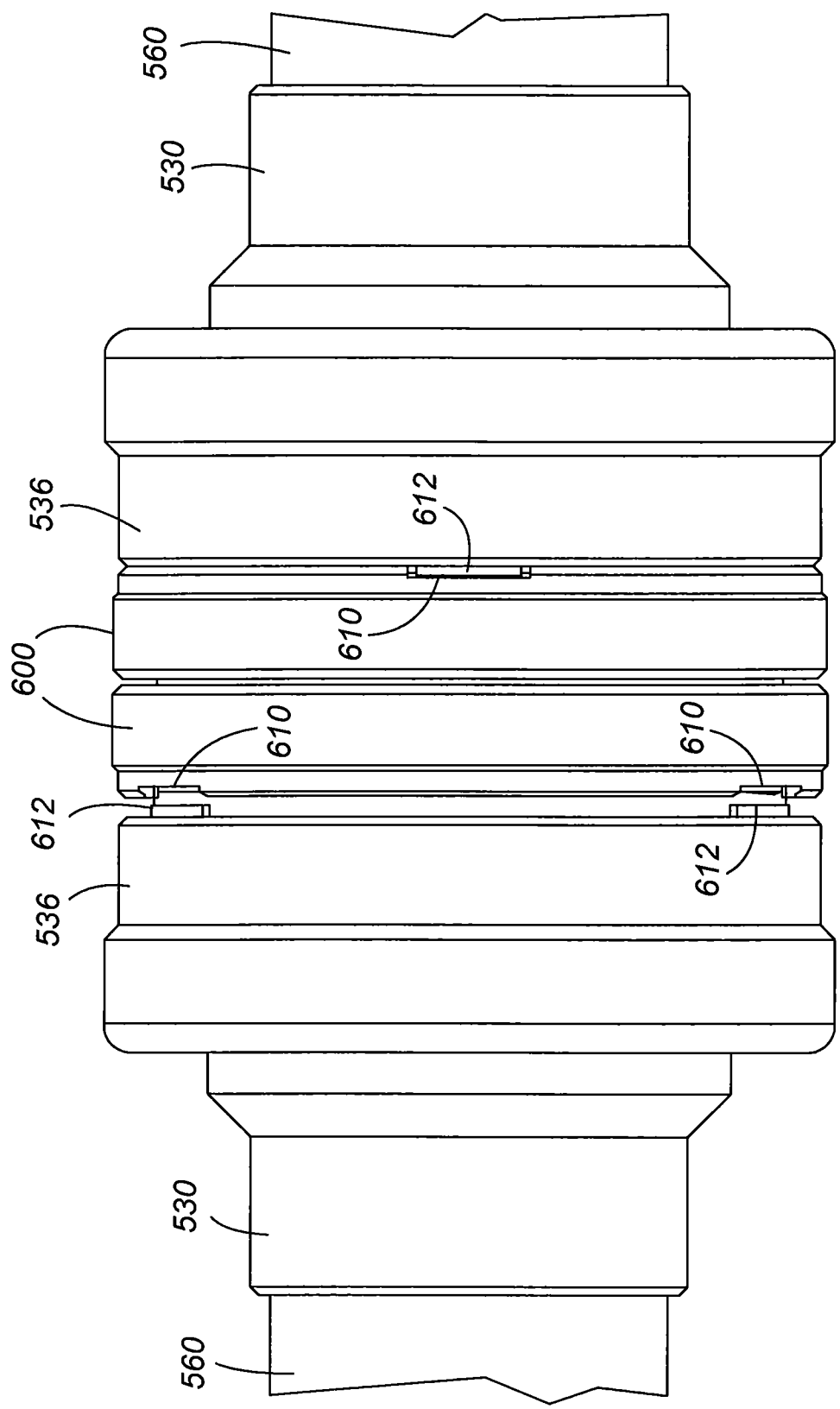
FIG. 7 illustrates a plan view of the assembled inline-type dielectric isolator of FIG. 5.

FIG. 7 illustrates a plan view of the embodiment of FIGS. 5 and 6. As shown, the lock nuts 536 are positioned on opposite ends of the outer annular member 506 and the pair of lock rings 600 is positioned between the lock nuts. The lock rings 536 and lock nuts 600 have a slightly larger diameter than the shroud 560; however the isolator 500 nonetheless provides a relatively compact inline solution that can be easily installed at most locations in a fuel system. The positive locking feature of this embodiment is achieved by selective releasable engagement of the lock nuts with their corresponding lock rings. As shown in this FIG. 7, tabs 612 are formed on one of the lock nuts, while a complementary notch 610 is formed on the corresponding lock ring. When the lock nut is threaded over the member 506 a predetermined distance, the tabs 612 and notches 610 align. The left lock ring in FIG. 7 has been axially displaced towards the right thus showing a gap between the aligned tabs 612 and notches 610. Displacement of the lock ring in this manner allows the left lock nut 536 to be unthreaded to thus unlock that side of the coupling arrangement. As mentioned above, the wave spring 604 provides the biasing force to maintain the lock nut/lock ring pair in engagement when the lock nut is threaded in a position for alignment of the tabs/notches. FIG. 7 also shows one tab 612 and notch 610 on the right lock nut/lock ring pair. If it is desired to unlock the right side lock nut/lock ring pair, the right lock ring can be axially displaced to the left thus allowing the right lock nut to be unthreaded. It shall be understood that either the lock rings or lock nuts may have tabs or notches formed thereon in the complementary fashion. The audible clicking sound is achieved when the nuts are locked to their corresponding lock nuts. As also mentioned, visual indicia may also be provided on the members 506 to confirm the positive locking arrangement, such as an indicator stripe which if visible would indicate that the coupling is not locked.

The present invention, thus generally described, will be understood more readily by reference to the following examples, which are provided by way of illustration and are not intended to be limiting.

EXAMPLES

Materials. CF is an abbreviation for carbon fiber, and MCF is an abbreviation for milled carbon fiber, prepared by milling the CF. The CF used in the following tables is Tenax 303 available from Toho Tenax, Rockwood, Tenn. GF is an abbreviation for glass fiber. The GF used in the following is Vetrotex EC 10, available from Owens Corning, Toledo, Ohio. PEEK is an abbreviation for polyetheretherketone. The PEEK used in the following tables is Victrex 150 P, available from Victrex USA, West Conshohocken, Pa. CNT is an abbreviation for carbon nanotubes. The CNT used in the following tables was Nanocyl 7000, available from Nanocyl, Inc.

Each of the examples is a ladder study to determine the impact of the individual components of the compositions. Extruded compositions were prepared by compounding the PEEK with the CNT in a twin screw extruder to form a master batch of 10 wt % CNT in PEEK (MB CNT). The master batch was then further compounded with additional PEEK, and also the CF and the GF in a single-screw extruder. After extrusion and cooling, the compounded materials, were cut to appropriate dimensions.

Comparative Example 1

MCF and GF Constant

| Sample | PEEK (%) | MB CNT (%) | MCF (%) | GF (%) |
|---|---|---|---|---|
| 1 | 43 | 2.0 | 12 | 25 |
| 2 | 38 | 2.5 | 12 | 25 |
| 3 | 33 | 3.0 | 12 | 25 |
| 4 | 28 | 3.5 | 12 | 25 |
| 5 | 23 | 4.0 | 12 | 25 |
| 6 | 18 | 4.5 | 12 | 25 |

Comparative Example 2

CNT and GF Constant

| Sample | PEEK (%) | MB CNT (%) | MCF (%) | GF (%) |
|---|---|---|---|---|
| 7 | 60 | 5 | 10 | 25 |
| 8 | 62 | 5 | 8 | 25 |
| 9 | 64 | 5 | 6 | 25 |
| 10 | 66 | 5 | 4 | 25 |

Example 1

GF Constant

| Sample | PEEK (%) | MB CNT (%) | MCF (%) | GF (%) |
|---|---|---|---|---|
| 11 | 67 | 5 | 3 | 25 |
| 12 | 68 | 5 | 2 | 25 |
| 13 | 65.5 | 3.5 | 6 | 25 |
| 14 | 67.5 | 3.5 | 4 | 25 |
| 15 | 68.5 | 3.5 | 3 | 25 |
| 16 | 69.5 | 3.5 | 2 | 25 |

Example 2

GF, MCF and PEEK Constant

| Sample | PEEK (%) | MB CNT (%) | MCF (%) | GF (%) |
|---|---|---|---|---|
| 26 | 67.3 | 3.7 | 4 | 25 |
| 27 | 67.5 | 3.5 | 4 | 25 |
| 28 | 67.7 | 3.3 | 4 | 25 |
| 29 | 67.9 | 3.1 | 4 | 25 |
| 30 | 68.1 | 2.9 | 4 | 25 |
| 31 | 68.3 | 2.7 | 4 | 25 |

Example 3

Volume Resistivities

| Sample | Vol. Resistivity at 500 VDC ($\Omega$-cm) | Vol. Resistivity at 1000 VDC after 1 cycle ($\Omega$-cm) | Vol. Resistivity at 5000 VDC after 1 cycles ($\Omega$-cm) |
|---|---|---|---|
| 11 | 1.923E+06 | 5.123E+07 | TC |
| 12 | NR/I | 1.775E+06 | TC |
| 13 | NR/I | NR/I | 5.00E+08 |
| 14 | NR/I | NR/I | 7.58E+08 |
| 15 | NR/I | NR/I | NR/I |
| 16 | NR/I | NR/I | NR/I |
| 26 | 2.79E+05 | 1.76E+05 | 2.92E+04 |
| 27 | 1.69E+06 | 8.98E+05 | 1.07E+05 |
| 28 | 7.81E+08 | 5.21E+08 | 2.73E+07 |
| 29 | — | — | — |
| 30 | — | — | — |
| 31 | — | — | — |

TC = Too Conductive to measure
NR/I = No Reading as the material was too insulative to determine.

In the above examples, comparative examples 1 and 2 were found to be too conductive for application in a high strike voltage application. As noted, it is desired that upon application of a voltage such as 5,000 volts DC, the composition that is nominally insulative, will exhibit a bulk volume resistivity from about $10^3$ $\Omega$-cm to $10^{10}$ $\Omega$-cm, which is then a dissipative or shielding material. The other examples are illustrative of the at least some of the breadth of the compositions that meet the desired properties. Other compositions will be evident to those of skill in the art based upon the described embodiments.

One exemplary composition includes a thermoplastic organic polymer, a plurality of carbon nanotubes, and a plurality of carbon fibers, where the composition exhibits a bulk volume resistivity from about $10^3$ $\Omega$-cm to $10^{10}$ $\Omega$-cm at 5,000 volts DC, and the thermoplastic organic polymer includes about 60 wt % to 75 wt % 4-(4-(4-oxyphenoxy)-phenoxy)-benzoyl polyetheretherketone. In such compositions, from about 60 wt % to 75 wt % of the thermoplastic organic polymer may be present, from about 0.2 to 0.5 wt % of the carbon nanotubes may be present, from about 15 to 40 wt % of the glass fiber may be present; and from about 2 to 7 wt % of the carbon fibers may be present. The composition may exhibit a bulk volume resistivity of about $10^6$ $\Omega$-cm to about $10^{10}$ $\Omega$-cm at 5,000 volts DC. In such materials, the composition may exhibit a bulk volume resistivity of at least about $10^6$ $\Omega$-cm at 100 volts DC. In other embodiments, the tube composition may exhibit a bulk volume resistivity of at least about $10^8$ $\Omega$-cm at 100 volts DC, or, alternatively, at least about $10^9$ $\Omega$-cm at 100 volts DC.

Example 4

Electrical Resistance of Dielectric Isolator

In one particular aircraft fuel system application, dielectric isolators were required to exhibit an electrical resistance of from about $10^5 \Omega$ to $10^8 \Omega$ when measured from end to end at an applied potential of 500 volts DC or greater. To meet these requirements, inline-type dielectric isolators, similar to the ones described above and illustrated in FIGS. 1A and 1B, were injection molded from a material that contained 67.5 wt % PEEK, 0.35 wt % carbon nanotubes, 4 wt % carbon fibers, and 25 wt % glass fiber. The dielectric isolators were molded into cylindrical tubes having three different nominal diameters: 0.75 inches, 2 inches, and 4 inches. Aluminum ferrules that conform to SAE AS5836-1-XX (flex) and SAE AS1656-1-XX (rigid) and finished with a chemical conversion coat per MIL-C-5541 were attached to the ends of the tubes via stub ACME threads. The overall length of each dielectric isolator was 5.4 inches from the end of one ferrule to the end of the other ferrule.

Figure 8:
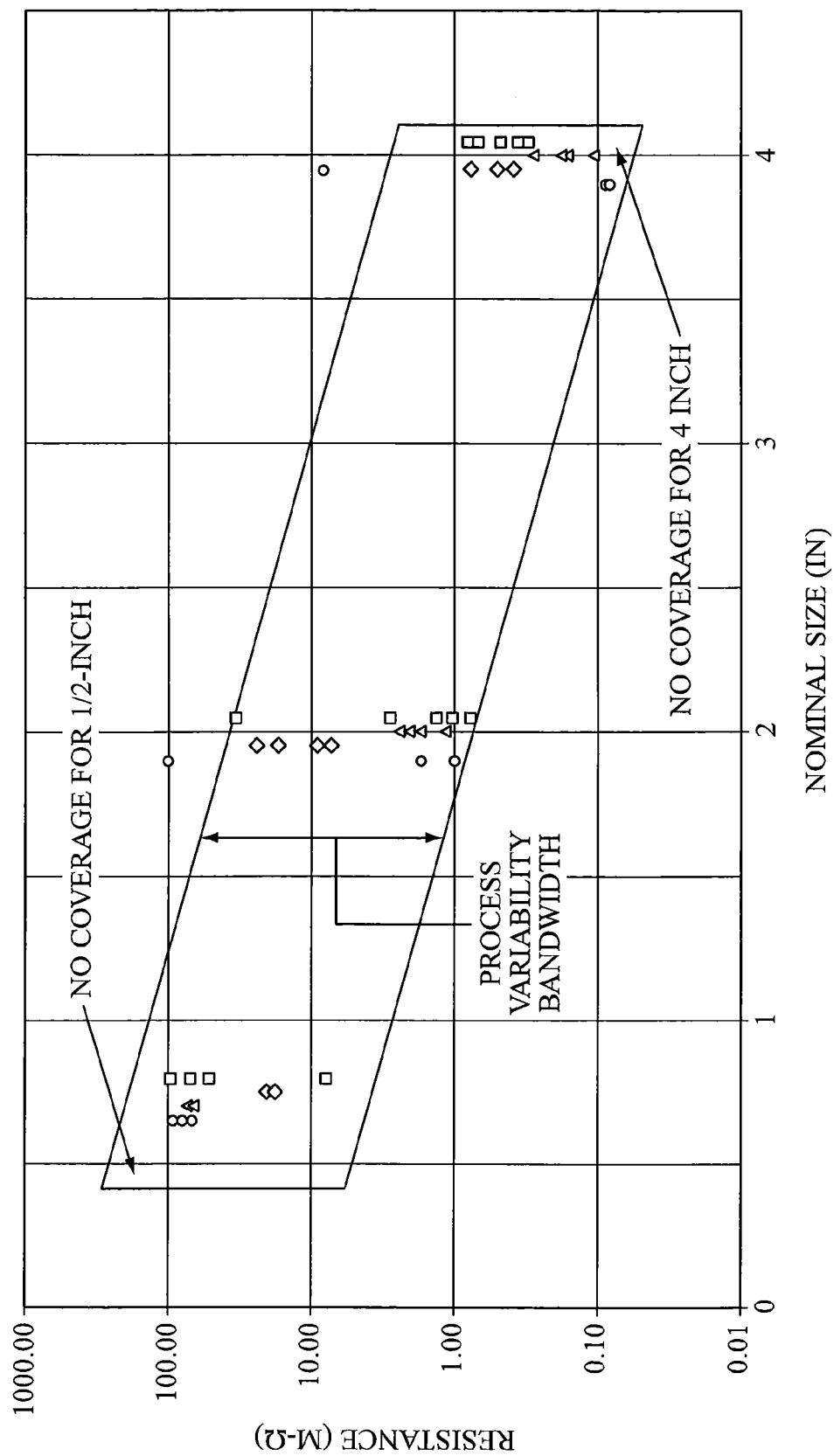
FIG. 8 illustrates a graph of electrical resistance (y-axis) vs. tube diameter size (x-axis) for pre-lightning strike testing of an exemplary tube composition.

Each dielectric isolator was tested for dielectric performance (pre-lightning test) by measuring the electrical resistance of the dielectric isolator from end to end at an applied potential of 500 volts DC or greater (as high as 6,000 volts DC), with one test probe located on the outside surface of one ferrule and another test probe located on the other ferrule. As shown in FIG. 8, the test results show that a very large percentage of the dielectric isolators met the resistance requirements from about $10^5 \Omega$ to $10^8 \Omega$. However, as indicated by the process variability bandwidth in the graph of FIG. 9, full coverage would not exist for 0.5 inch diameter isolators as well as 4 inch diameter isolators. To meet the electrical resistance requirements across the entire size matrix, it has been proposed to provide two slightly different tube compositions—one tube composition with a slightly higher carbon fiber content (e.g., 4.2 wt %) and another tube composition with a slightly lower carbon fiber content (e.g., 3.8 wt %). Generally, by increasing the carbon fiber content in the composition, the electrical resistance of the isolator decreases.

After completing the measurement of the electrical resistance of the dielectric isolators described above, the isolators were then exposed to simulated lightning events consisting of twelve voltage pulses, six in each polarity (positive and negative), having a peak amplitude of 9,000 volts that conform to voltage waveform B in accordance with SAE ARP5412. The testing was performed per SAE ARP5416 with one test probe located on the outside surface of one ferrule and another test probe located on the other ferrule. To pass the test, each isolator should not exhibit electrical arcing or sparking, either internally or externally, or voltage/current waveform collapse during and after exposure to the twelve voltage pulses. At the conclusion of the testing, all of the isolators passed the simulated lightning strike test as none of them exhibited an arc, spark, or waveform collapse.

Figure 9:
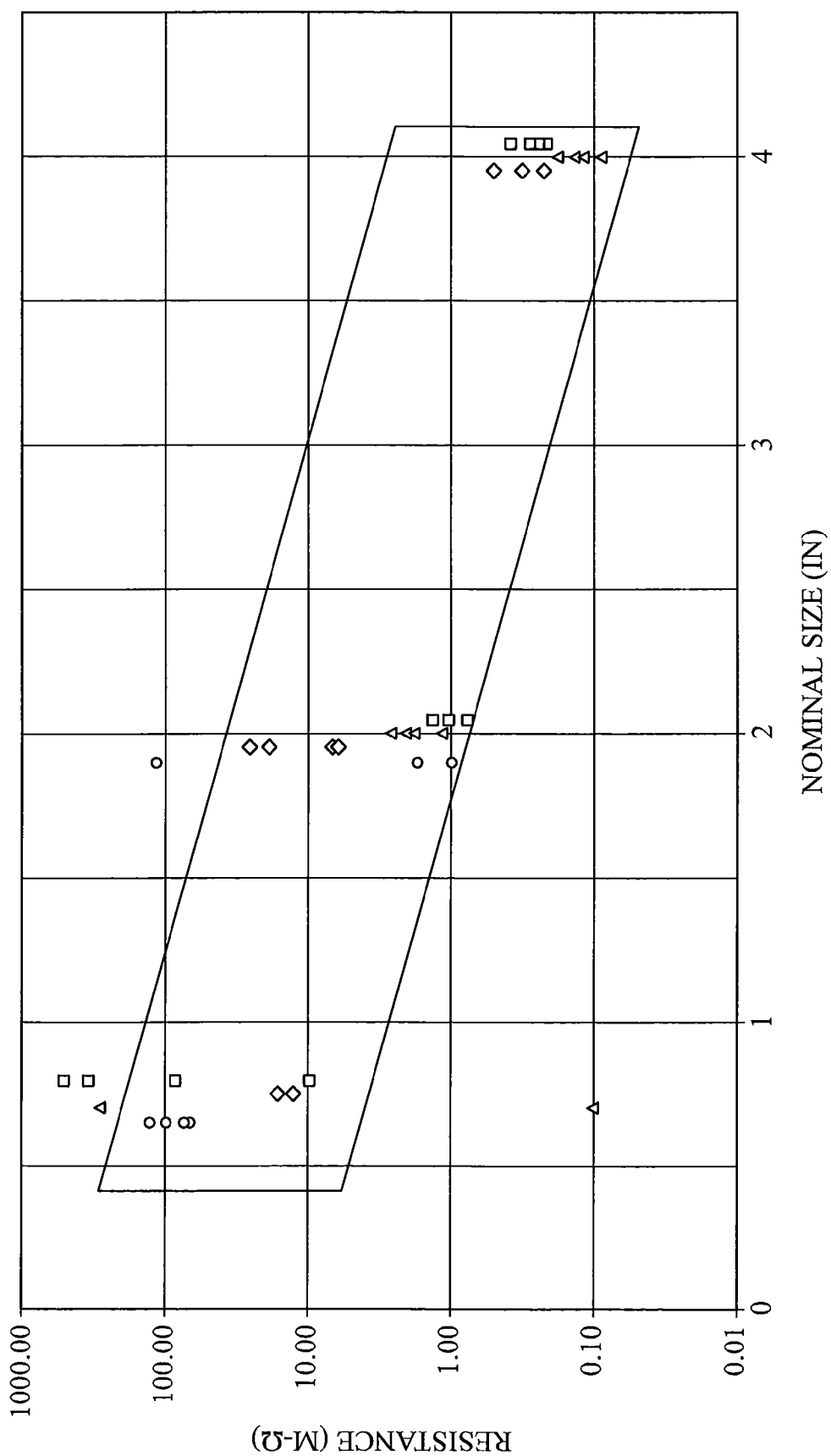
FIG. 9 illustrates a graph of electrical resistance (y-axis) vs. tube diameter size (x-axis) for post-lightning strike testing of the same exemplary tube composition.

Each dielectric isolator was then retested for dielectric performance (post-lightning test) by measuring the electrical resistance of the dielectric isolator from end to end at an applied potential of 500 volts DC or greater (as high as 6,000 volts DC), with one test probe located on the outside surface of one of the ferrules and another test probe located on the other ferrule, to ensure that the electrical resistance for each isolator was still between about $10^5 \Omega$ and $10^8 \Omega$. As shown in FIG. 9, the test results show that a large percentage of the dielectric isolators met the resistance requirements of between about $10^5 \Omega$ and $10^8 \Omega$ following the simulated lightning strike test.

While several, non-limiting examples have been illustrated and described, it should be understood that changes and modifications can be made therein in accordance with ordinary skill in the art without departing from the invention in its broader aspects as defined in the following claims.

It will be appreciated that the dielectric isolators 100, 200 described above are particularly suited for use in aircraft fuel systems because they allow enough current to flow therethrough to prevent electrostatic charge build up due to fluid flow through or around the outer surface of the fuel line, yet limit the flow of indirect current associated with voltage therethrough during a lightning strike to current levels that are relatively low and safe for the aircraft fuel system. They are electrically robust in that repeated lightning events should not materially affect their electrical resistances. Additionally, because a substantial portion of the tube composition includes PEEK, the dielectric isolators 100, 200 are lightweight, yet have a high mechanical strength. Moreover, since the dielectric isolators 100, 200 are injection molded, one or more of the following benefits can be achieved: quick process cycle time, inexpensive process cost, minimal porosity issues, and reduced scrap.

It will be appreciated that the dielectric isolators 100, 200 described above are not only useful in aircraft fuel systems, but also can be utilized in many other applications including, without limitation, petroleum and other fluid distribution applications.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

The invention claimed is:

1. A fluid carrying element for use as a dielectric isolator in a fuel system of an aircraft, and especially adapted for interconnecting opposing ends of a fluid carrying member of the fuel system in an inline configuration, the fluid carrying element comprising:
    at least one tube in the fuel system of the aircraft arranged in the inline configuration for carrying fluid, the at least one tube having a dielectric isolator composition including polyetheretherketone PEEK and carbon nanotubes; and a pair of fittings attached to opposing ends of the at least one tube, each fitting including a threaded portion that is threaded onto exterior threads formed on a corresponding end of the at least one tube, and each fitting further including a swaged portion that is swaged onto a facing end of the fluid carrying member;

wherein the tube composition exhibits a bulk volume resistivity from about $10^3$ Ω-cm to $10^{10}$ Ω-cm at an applied potential of 5,000 volts DC;

wherein the tube composition includes (i) from about 50 wt % to 98 wt % of PEEK (ii) from about 0.05 wt % to 2.0 wt % of the carbon nanotubes, (iii) milled carbon fibers and (iv) glass fibers; and wherein the tube composition exhibits a five-strike bulk volume resistivity degradation of no more than a factor of 50% at an applied potential of greater than 5,000 volts DC.

2. The fluid carrying element of claim 1, wherein the tube composition includes from about 1 wt % to 10 wt % of the milled carbon fibers.

3. The fluid carrying element of claim 1, wherein the tube composition includes from about 5 wt % to 60 wt % of the glass fiber.

4. The fluid carrying element of claim 1, wherein the tube composition includes from about 60 to 75 wt % of PEEK, from about 0.2 to 0.4 wt % of the carbon nanotubes, from about 2 to 7 wt % of the carbon fibers, and from about 15 to 40 wt % glass fiber.

5. A dielectric isolator in a fuel system of an aircraft, and especially adapted for interconnecting opposing ends of a fluid carrying member of the fuel system in an inline configuration, comprising:

at least one tube in the fuel system of the aircraft arranged in the inline configuration for carrying fluid, the at least one tube having a composition including a thermoplastic organic polymer including PEEK, milled carbon fibers, carbon nanotubes, and glass fiber;

a pair of fittings attached to opposing ends of the at least one tube, each fitting including a threaded portion that is threaded onto exterior threads formed on a corresponding end of the at least one tube, and each fitting further including a swaged portion that is swaged onto a facing end of the fluid carrying member; and wherein the dielectric isolator exhibits an electrical resistance from about $10^5$Ω to $10^8$Ω at an applied potential of greater than 500 volts DC when measured from one fitting to the other fitting and wherein the tube composition includes from about 50 wt % to 98 wt % of PEEK and from about 0.05 wt % to 2.0 wt % of the carbon nanotubes; and wherein the dielectric isolator does not exhibit electrical arcing or sparking, either internally or externally, or waveform collapse during and after exposure to twelve voltage pulses, six in each polarity (positive and negative), having a peak amplitude of 9,000 volts that conform to voltage waveform B in accordance with SAE ARP5412.

6. The dielectric isolator of claim 5, wherein the tube composition includes from about 1 wt % to 10 wt % of the milled carbon fibers.

7. The dielectric isolator of claim 5, wherein the tube composition includes from about 5 wt % to 60 wt % of the glass fiber.

8. The dielectric isolator of claim 5, wherein the tube composition includes from about 60 to 75 wt % of PEEK, from about 0.2 to 0.4 wt % of the carbon nanotubes, from about 2 to 7 wt % of the carbon fibers, and from about 15 to 40 wt % glass fiber.

9. The dielectric isolator of claim 5, further comprising a flange attached to the tube between the end fittings and configured to be attached to a bulkhead.

10. The dielectric isolator of claim 9, wherein the flange is constructed of aluminum and attached to the tube via stub ACME threads.

\* \* \* \* \*